US006594004B1

United States Patent
Makita

(10) Patent No.: US 6,594,004 B1
(45) Date of Patent: Jul. 15, 2003

(54) COMPACT OPTICAL TIME DOMAIN REFLECTOMETER HAVING ENHANCED ACCURACY

(75) Inventor: Satoshi Makita, Atsugi (JP)

(73) Assignee: Anritsu Corporation, Tokyo (JP)

( * ) Notice: Subject to any disclaimer, the term of this patent is extended or adjusted under 35 U.S.C. 154(b) by 44 days.

(21) Appl. No.: 09/830,526

(22) PCT Filed: Sep. 6, 2000

(86) PCT No.: PCT/JP00/06027

§ 371 (c)(1),
(2), (4) Date: Apr. 26, 2001

(87) PCT Pub. No.: WO01/20288

PCT Pub. Date: Mar. 22, 2001

(30) Foreign Application Priority Data

Sep. 10, 1999 (JP) .................................. 11-257453

(51) Int. Cl.⁷ .............................................. G01N 21/00
(52) U.S. Cl. ...................................................... 356/73.1
(58) Field of Search ...................... 356/73.1, 44, 479;
  359/124, 248, 305, 110, 177, 109, 159;
  385/134, 100, 88; 250/227.11–227.28; 455/130,
  269, 280, 293, 73

(56) References Cited

U.S. PATENT DOCUMENTS 4,732,469 A * 3/1988 Souma ...................... 356/73.1

FOREIGN PATENT DOCUMENTS

JP  58-120316  7/1983
JP  1-232228   9/1989

* cited by examiner

Primary Examiner—Tu T. Nguyen
(74) Attorney, Agent, or Firm—Frishauf, Holtz, Goodman & Chick, P.C.

(57) ABSTRACT

A light branching section applies a light pulse emitted in synchronism with a drive pulse (DP), to an optical fiber line path, and receives the light returning from the line path. An A/D converter performs equivalent sampling on the optical signal contained in the returning light, in synchronism with the sampling pulse (SP) of period T0. A measuring control circuit (MCC) generates DP a number (M) of times. The circuit generates N number of SPs every time it outputs DP. It outputs the SPs, at a time delayed by ΔT that corresponds to 1/M of the period T0. A clock signal generation circuit outputs to the MCC a first clock signal of a period T1 and a second clock signal of a period T2 different by Δt from the period T1. The MCC imparts a delay ΔT to the SPs, on the basis of the Δt.

18 Claims, 7 Drawing Sheets

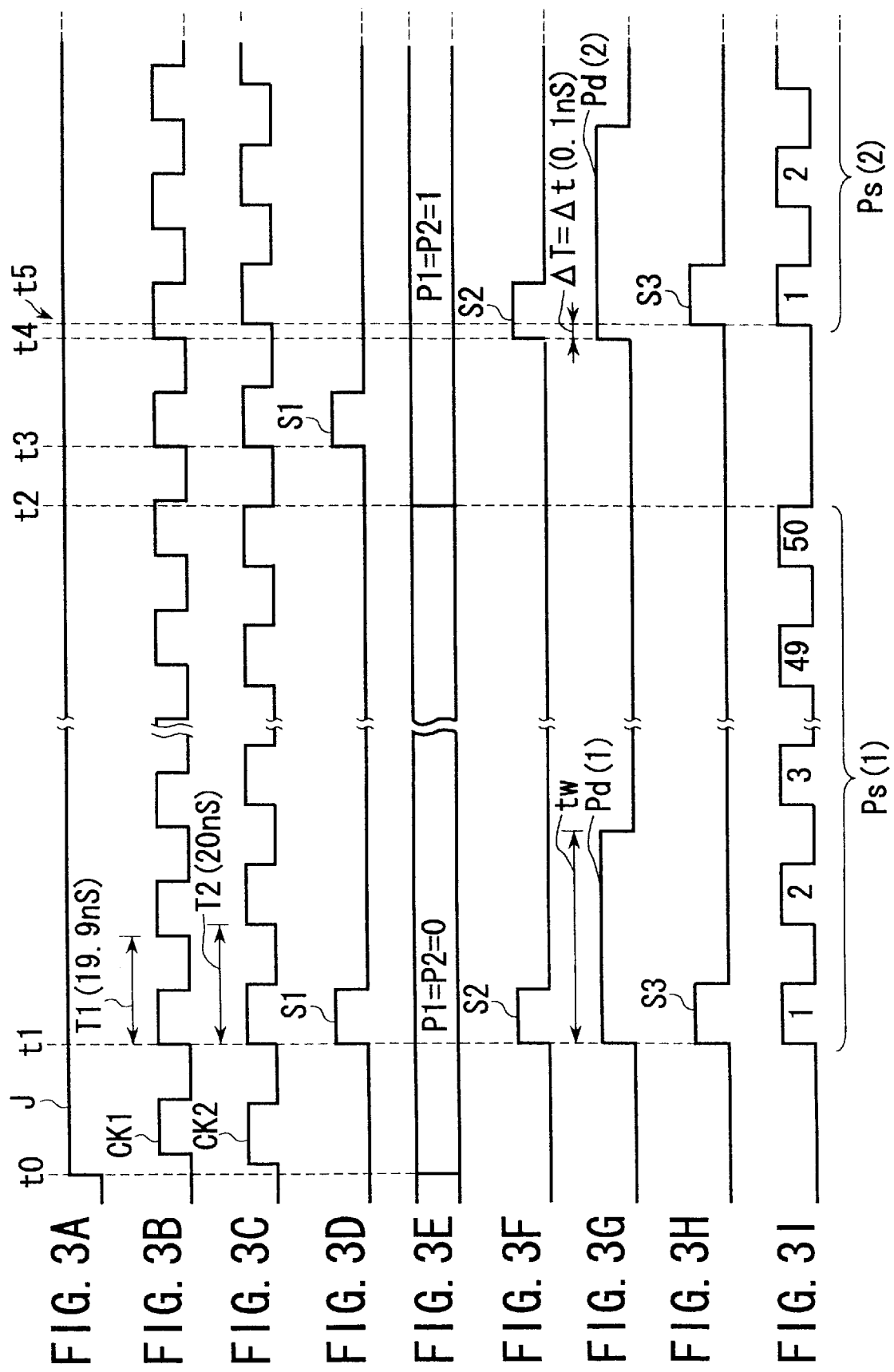

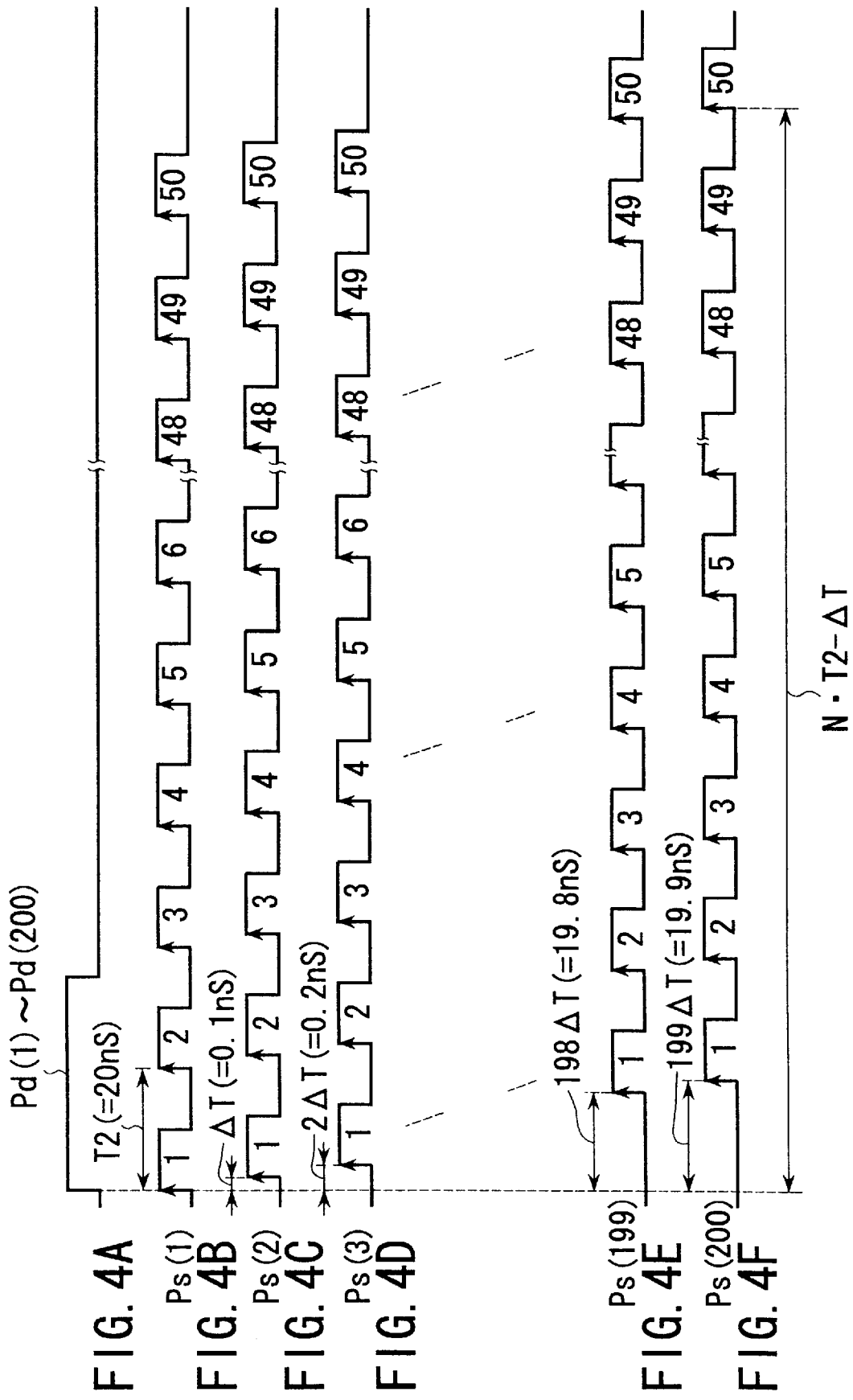

FIG. 8A (PRIOR ART)
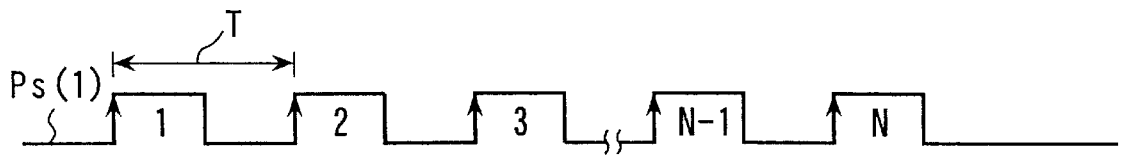
FIG. 8B (PRIOR ART)
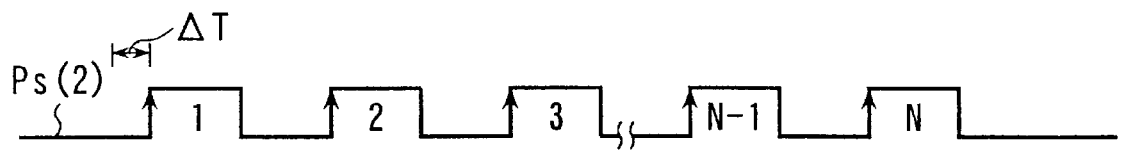
FIG. 8C (PRIOR ART)
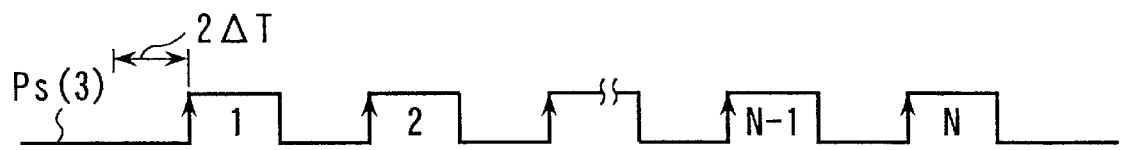
FIG. 8D (PRIOR ART)
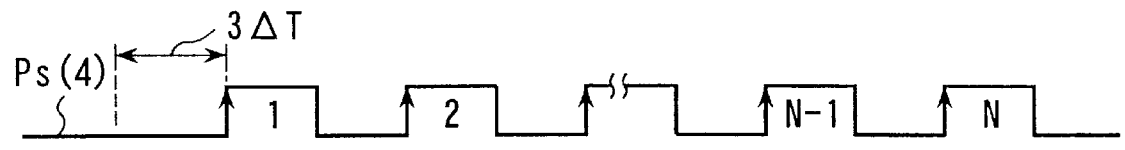
FIG. 8E (PRIOR ART)
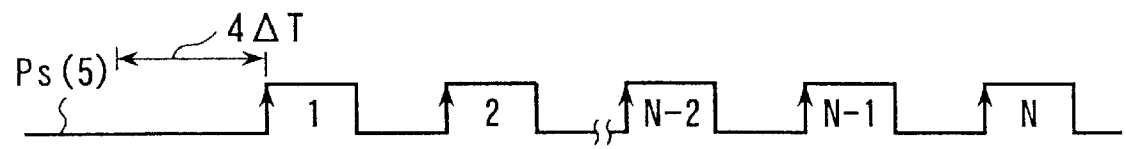
FIG. 8F (PRIOR ART)
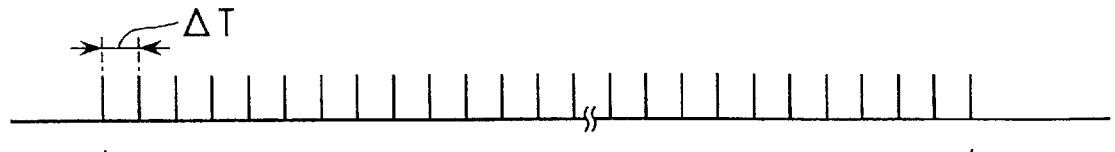
FIG. 8G (PRIOR ART)   $5 \cdot N$

COMPACT OPTICAL TIME DOMAIN REFLECTOMETER HAVING ENHANCED ACCURACY

This application is a U.S. National Phase Application under 35 USC 371 of International Application PCT/JP00/06027 (not published in English) filed Sep. 6, 2000.

TECHNICAL FIELD

The present invention relates to an optical time domain reflectometer (hereinafter referred to as an OTDR) and, in particular, to an OTDR for inputting a light pulse into an optical fiber line path and finding an intensity variation of returned light from the optical fiber line path with respect to a time in which the OTDR adopts a technique for achieving an enhanced distance accuracy.

BACKGROUND ART

In the case where the test of a communication system using an optical fiber line path is carried out, use is made of an OTDR 10 having a structure as shown in FIG. 7.

That is, this OTDR 10 is so configured as to input a light pulse from a light pulse generation section 12 through a directional couper 11 to an optical fiber line path 1 as a to-be-tested object connected to a connection terminal 10*a*, receive the light which is returned back from the optical fiber line path 1 at a light receiving unit 13 via-the directional coupler 11, and, while sampling the receiving signal by an analog/digital (A/D) converter 14 with a predetermined frequency, convert it to a digital value.

And this OTDR 10 finds a digital value which is outputted from the A/D converter 14 until a predetermined time elapses from the inputting of the light pulse, as data representing the transmission characteristic of the optical fiber line path 1.

It is to be noted that, in FIG. 7, a measurement control circuit 15 outputs a drive pulse Pd to the light pulse generation section 12 to allow a light pulse to exit in synchronism with the drive pulse Pd while, on the other hand, the control circuit 15 outputs a sampling pulse PS of a predetermined period to the A/D converter 14 a predetermined number of times to allow the sampling of a receiving signal.

In the OTDR 10 thus configured, a resolution as to the time determines a resolution as to the distance of the characteristic of the optical fiber line path 1.

In order to make measurement with a high distance resolution it is necessary to make the period of the sampling pulse Ps of the A/D converter 14 smaller.

However, there is a limitation to the sampling speed of the A/D converter 14 and, in order to maintain the accuracy of the data higher, a problem arises from the fact that it is not preferable to increase the sampling speed up to its limit.

In order to solve this problem, the conventional OTDR 10 does the following.

First, in order to find the characteristic of one optical fiber line path 1 a drive pulse Pd of a predetermined width is outputted an M number of times (it is assumed that M=5) as shown in FIG. 8A.

And, as shown in FIGS. 8B–F, respective N numbers of sampling pulses Ps (1), Ps (2), . . . , Ps (5) are outputted to the A/D converter 14 while delaying their output start timing by a predetermined time $\Delta T$ (1/M of a period T of the sampling pulse Ps) with respect to the output timing of the drive pulse Pd at each number of times.

The system of obtaining a series of data by shifting the sampling start timing by "1/an integral number" of the period of the sampling pulse with respect to the analog signal repeatedly inputted with the same waveform is generally called as an interleave sampling.

By performing such sampling based on this interleave sampling it is possible to obtain data equivalent to the case when a signal received from the incidence of the light pulse into the optical fiber line path 1 until the passage of an N·T–$\Delta T$ time is M·N times continuously sampled with a period $\Delta T$ shorter than a period T of the sampling pulse PS, as shown in FIG. 8G.

That is, the sampling speed of the A/D converter 14 can be made equivalent to that multiplied M times.

In order to relatively delay the output start timing of the sampling pulse Ps by a predetermined time $\Delta T$ in this way, the conventional OTDR 10 includes the measurement control circuit 15 configured as shown in FIGS. 9 and 10.

In the structure as shown in FIG. 9, a clock signal generation circuit 16 generates a clock signal CKr of a predetermined period T as a reference.

This clock signal CKr is input to a drive pulse generation circuit 17 and to a plurality of delay elements 18 (1), 18 (2), . . . , 18 (M).

The drive pulse generation circuit 17 is so configured that, upon receipt of a start signal for designating a measurement start, it outputs a drive pulse Pd of a predetermined time width, an M number of times, in synchronization with the clock signal CKr with a period longer than N times the period T of the clock signal CKr.

The delay elements 18 (1), 18 (2), . . . , 18 (M) output the inputted clock signals CKr to the select circuit 19 while being delayed by 0, $\Delta T$, 2$\Delta T$/, . . . , (M−1) $\Delta T$.

The select circuit 19 selectively provides, as a sampling pulse Ps, an output out of these outputs of the delay elements 18 (1), 18 (2), . . . , 18 (M) which is designated from a switching circuit 20.

The switching circuit 20 sets the select circuit 19 in a non-select state until receiving a start signal and, upon receipt of the start signal, causes the select circuit 19 to select an output of the delay circuit 18 (1).

When, by doing so, an N number of sampling pulses Ps are outputted from the select circuit 19, the switching circuit 20 again sets the select circuit 19 in a non-select state.

And the switching circuit 20 causes the output of the delay element 18 (2) to be selected by the select circuit 19 upon receipt of the next drive pulse as an output pulse.

By doing so, when a predetermined N number of sampling pulses Ps are outputted from the select circuit 19, the switching circuit 20 again sets the select circuit 19 in a non-select state.

In the same way as set out above, the switching circuit 20 causes the select circuit 19 to select the outputs of the delay elements 18 (3), . . . , 18 (M).

When the output of the last delay element 18(M) is selected by the select circuit 19 and the predetermined number N of sampling pulses Ps are outputted, then the switching circuit 20 causes the select circuit 19 to be set to the non-select state, thus waiting for the inputting of the next start signal.

By the select operation by the switching circuit 20 of the delay elements 18 (1), 18 (2), . . . , 18 (M) it is possible to provide respective N numbers of sampling pulses Ps (1), Ps (2), . . . , Ps (M), as shown in FIGS. 8A to G, to the A/D converter 14 while delaying the output start timing by a predetermined time ΔT with respect to the output timing of the drive pulse Pd at each number of times.

In an arrangement shown in FIG. 10, a clock signal CKr outputted from a clock signal generation circuit 16 is divided by a frequency divider 21 into, for example, four frequency division parts which are inputted as a frequency divided signal CKd to an integrating circuit 22.

The integrating circuit 22 integrates the frequency divided signal CKd and outputs a ramp function signal V (=αt) for example, with a voltage V increasing from 0 volt in proportion (proportional constant α) to a time t with its high level time point as a reference.

The ramp function signal V, together with a reference voltage Vr from a reference voltage generator 23, is inputted to a comparator 24 where comparison is made between the ramp function signal V and the reference voltage Vr.

At a timing that the ramp function signal V coincides with the reference voltage Vr and the output of the comparator 24 is inverted, a drive pulse generation circuit 17 outputs a drive pulse Pd of a predetermined width while, on the other hand, a sampling pulse generation circuit 25 starts to output an N number of sampling pulses Ps in synchronization with the clock signal CKr.

Until receiving a start signal, the switching circuit 26 sets the reference voltage Vr which is outputted from the reference voltage generator 23 to a voltage higher than a maximal value of the ramp function signal V outputted from the integrating circuit 22 to prevent the output of the comparator 24 from being set in a non-inverting state.

Upon receipt of the start signal, the switching circuit 26 sets the reference voltage Vr to, for example, α·2T during the low level period of the frequency divided signal CKd and, when a 2T time is passed after the frequency divided signal CKd rises to a high level, the output of the comparator 24 is inverted to allow a drive pulse Pd to be outputted and an N number of sampling pulses Ps (1) to start being outputted with its initial pulse put in synchronization with the drive pulse Pd.

It is to be noted that, when the frequency divided signal CKd becomes a low level while the N number of sampling pulses Ps are outputted, the switching circuit 26 sets the reference voltage Vr to a voltage higher than a maximal value of the ramp function signal V and, by doing so, prevents the output of the comparator 24 from being set to a non-inverted state.

During the low level period of the frequency divided signal CKd following the outputting of this first N number of sampling pulses Ps, the switching circuit 26 sets the reference voltage Vr to α (2T−ΔT) and, upon the elapsing of a (2T−ΔT) time after the frequency divided signal CKd rises to a high level, inverts the output of the comparator 24 to allow the drive pulse Pd to be outputted and the outputting of an N number of sampling pulses Ps (2) to be started while being delayed by ΔT from the output timing of the drive pulse Pd.

In the same way as set out above, the switching circuit 26 switches the reference voltage Vr to α(2T−2ΔT), α (2T−3ΔT), α (2T−4ΔT), . . . , α (T+ΔT) to allow the outputting of the N number of sampling pulses Ps to be started while being delayed by 2ΔT, 3ΔT, 4ΔT, . . . , (T−ΔT) from the output timing of the drive pulse Pd and, by doing so, as shown in FIGS. 8A to G, respective N numbers of sampling pulses Ps (1), Ps (2), . . . , Ps (M) are outputted to the A/D converter 14 while delaying their output start timings by ΔT with respect to the output timing of the drive pulse Pd at each number of times.

However, the time accuracy of such ordinary delay element as used in the arrangement shown in FIG. 9 is very low and it currently has an accuracy limit of several nanoseconds and, in order to obtain more time resolution, it is necessary to use a cable's delay function.

Incidentally, the delay element using the cable is structurally difficult to manufacture as a smaller unit.

Further, the system using the switching of such delay elements as set out above requires a greater number of elements as the time resolution is enhanced, so that a resultant apparatus becomes bulkier.

In the structure as shown in FIG. 10 in which the clock signal (frequency divided signal) is integrated by the integrating circuit 22 and its output voltage is compared by the comparator 24 with the reference voltage Vr, the accuracy of the delay time is lowered due to the nonlinearity of the integrating circuit 22, thus presenting a problem.

Disclosure of Invention

It is accordingly the object of the present invention to solve the above-mentioned problems and to provide an OTDR which can be constructed as a compact unit with high accuracy.

According to one embodiment of the present invention, there is provided an OTDR comprising:

a light pulse generation section (12) for receiving a drive pulse and generating a light pulse in synchronization with the drive pulse;

light branching means (11) for causing the light pulse which exits from the light pulse generation section to be incident into an optical fiber line path (1) as an object of testing, and for taking out returned light from the optical fiber line path;

a light receiving unit (13) for receiving the returned light taken out by the light branching means and converting it to a light receiving signal;

an A/D converter (14) for receiving a sampling pulse of a period T0 and, while subjecting the light receiving signal to equivalent sampling in synchronization with the sampling pulse, converting it to digital data;

a measurement control circuit (31) for generating the drive pulse a plurality of (M) times and outputting it to the light pulse generation section and for generating respective N numbers of sampling pulses relative to an output timing of the drive pulse at each number of times and outputting the sampling pulses to the A/D converter while delaying the respective N generation start timings by ΔT corresponding to 1/M of the period T0;

clock signal generating means (32) for outputting, to the measurement control circuit, a first clock signal of a period T1 and a second clock signal having a period difference Δt equal to a time corresponding to a minimal resolution required of the OTDR relative to the period T1; and data processing means (48) for obtaining a series of data representing an intensity variation relative to a time elapse of the returned light on the basis of the digital data outputted from the A/D converter, wherein the measurement control circuit provides a delay of the time ΔT of the sampling pulse on the basis of a period difference Δt of the first clock signal and second clock signal from the clock signal generating means.

BRIEF DESCRIPTION OF DRAWINGS

FIGS. 3A to I are a timing chart for explaining the operation of the OTDR of the first embodiment of the present invention;

FIGS. 4A to F are a timing chart for explaining the operation of the OTDR according to the first embodiment of the present invention;

FIGS. 8A to G are a timing chart for explaining the operation of equivalently shorting a sampling period in the conventional OTDR;

BEST MODE FOR CARRYING OUT OF THE INVENTION

Figure 1:
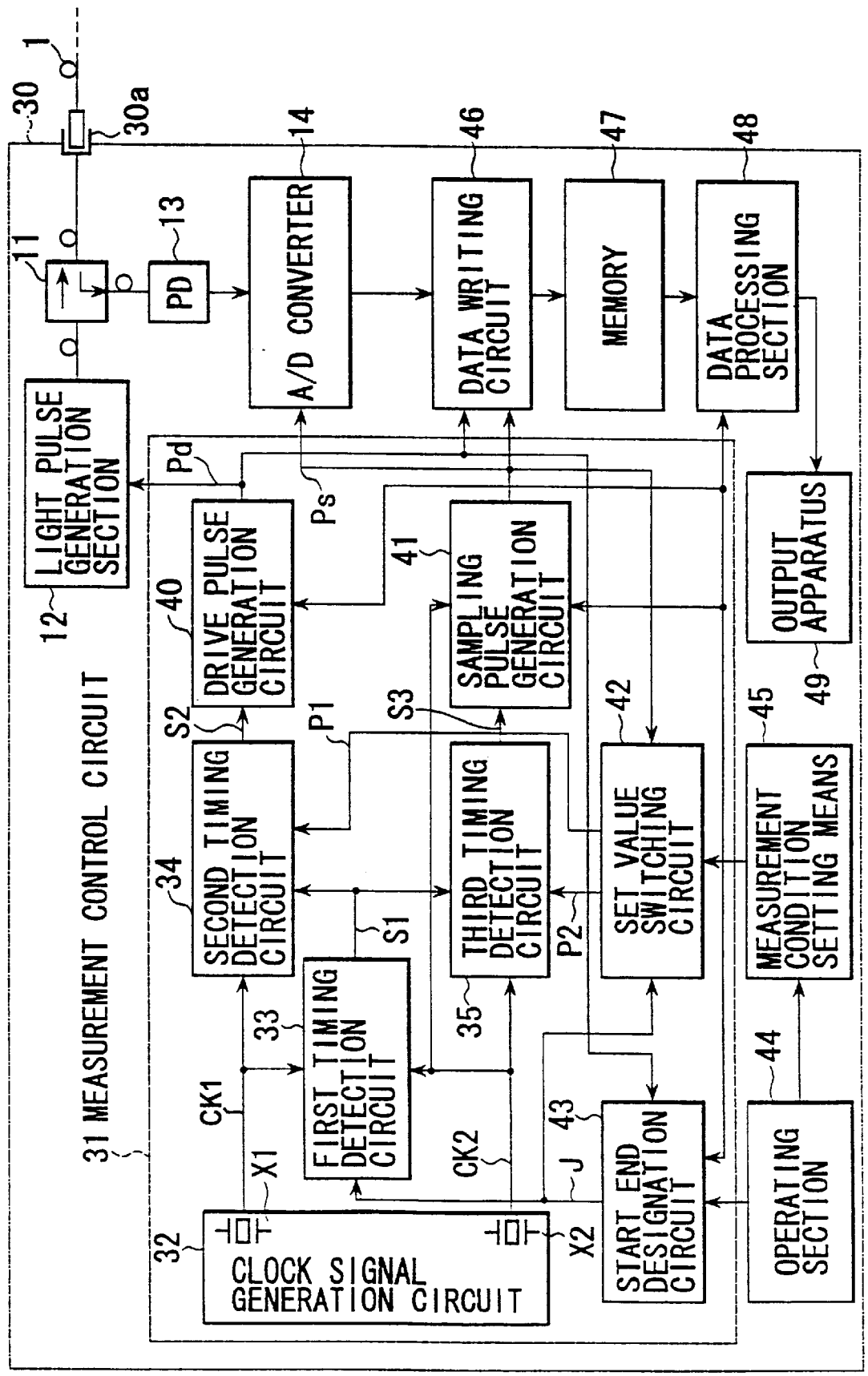
FIG. 1 is a block diagram showing an arrangement an OTDR according to a first embodiment of the present invention.

First, the outline of the present invention will be described below.

In order to achieve the object of the present invention, the OTDR of the present invention for causing a light pulse which is synchronized with a drive pulse to exit from a light pulse generation section (12) and to be incident into an optical fiber line path (1) as an object of testing, receiving returned light from the optical fiber line path at a light receiving unit (13) and, while sampling the receiving light by an A/D converter (14), obtaining a series of data representing an intensity variation relative to a time elapse of the returned light, comprises: clock signal generating means (32) for generating a first clock signal of a period T1 and a second clock signal of a period T2 having a period difference $\Delta t$ equal to a time corresponding to a minimal distance resolution required of the OTDR relative to the period T1; first timing detecting means (33) for detecting a timing at which the first clock signal and second clock signal are put to a predetermined phase difference; second timing detecting means (34) for detecting a timing at which the first clock signal is outputted a number of times equal to a first set value from the detection timing of the first timing detecting means; drive pulse generating means (40) for outputting a drive pulse of a predetermined width synchronized with the detection timing of the second timing detecting means to the light pulse generating means; third timing means (35) for detecting a timing at which the second clock signal is outputted a number of times equal to a second set value from the detection timing of the first timing detecting means; sampling pulse generating means (41) for outputting a predetermined N number of sampling pulses synchronized with the second clock signal from the detection timing of the third timing detecting means to the A/D converter and sampling the light receiving signal; and set value switching means (42) for, each time the predetermined N number of sampling pulses are outputted from the sampling:pulse generating means, sequentially switching the first and second set values to different values while setting a difference of these set values constant, in which, by performing respective N numbers of samplings on the light receiving signal a number of M times by switching the first set value and second set values, data is obtained as equivalent data involved when the light receiving signal outputted from the light receiving unit is continuously M·N times sampled with a period of an integral multiple of a period difference $\Delta t$ of the first clock signal and second clock signal.

With reference to the drawings, the respective embodiments of the present invention will be explained below based on the above-mentioned outline.

First Embodiment

FIG. 1 shows an arrangement of an OTDR 30 according to a first embodiment of the present invention.

In FIG. 1, a directional coupler 11, light pulse generation section 12, light receiving unit 13 and A/D converter 14 have the same structure as that of the conventional OTDR 10 and their explanation is omitted with the same reference numerals employed to designate parts or elements corresponding to those of the conventional OTDR 10.

In the OTDR 30, a light pulse generation section 12 which receives a drive pulse Pd exits a light pulse and this light pulse is incident through a directional coupler 11 into an optical fiber line path 1 connected to a connection terminal 30a.

In the OTDR 30, the light returned back from the optical fiber line path 1 is received by a light receiving unit 13 via the directional coupler 13 and an A/D converter receiving a sampling pulse Ps samples a receiving signal of the light receiving unit 13 to allow it to a digital value.

This OTDR 30 samples the receiving signal with the use of the above-mentioned interleave sampling.

For this reason, a measurement control circuit 31 outputs the drive pulse Pd to the light pulse generation section 12 and the sampling pulse to the A/D converter 14.

And the measurement control circuit 31 has a clock signal generation circuit 32 for outputting a first clock signal CK1 of a period T1 and a second clock signal CK2 of a period T2 slightly greater than the period T1.

A period difference ($\Delta t = T2 - T1$) of the two clock signals CK1 and CK2 is set to "1/an integral number" of the period T2 of the second clock signal CK2.

This period difference $\Delta t$ is a time corresponding to a minimal distance resolution required of the OTDR 30.

If, for example, the period T1 of the first clock signal CK1 is 19.9 nS (frequency: 50.251 MHz) and the period T2 of the second clock signal CK2 is 20.0 nS (frequency: 50.000 MHz), then the period difference $\Delta t$ of both is $\frac{1}{20}$ of the period T2 of the second clock signal CK2, that is, 0.1 nS (nanosecond).

This period difference $\Delta t$ is a time corresponding to a minimal distance resolution required of the OTDR 30.

Here, if the group index of refraction of the optical fiber line path 1 relative to the wavelength of the light pulse is given as 1.5, the length of the optical fiber line path 1 over which a light pulse can travel back and forth during $\Delta t = 0.1$ nS becomes substantially 1 cm. This length is a minimal distance resolution.

The clock signal generation circuit 32 may take any structure if the frequency and phase of the generated two clock signals CK1, CK2 are stable.

As the clock signal generation circuit 32, for example, use may be made of two independent crystal oscillation circuits X1, X2, as shown in FIG. 1, for outputting the first clock signal CK1 and second clock signal CK2.

Further, the first clock signal CK1 and second clock signal CK2 may be outputted with the use of a phase locked loop (PLL), a direct digital synthesizer (DDS), etc.

And the two clock signals CK1, CK2 from the clock signal generation circuit 32 are inputted to a first timing detection circuit 33.

The first timing detection circuit 33 includes a phase comparator for comparing the phases of the first clock signal CK1 and second clock signal CK2 during a period in which a state signal J from a later-described start end designation circuit 43 is at a level (for example, a high level) representing "now being measured".

And this first timing detection circuit 33 detects, as a synchronized timing, a timing at which the phase difference of the two clock signals CK1, CK2 becomes a predetermined value $\phi$ (for example, $\phi$=0), and outputs a first detection signal S1, at least an M number of times (M=a plural number), in synchronization with the detection timing.

Further, the first timing detection circuit 33 stops its function (at least stops the outputting of the first detection signal S1) during a period in which the state signal J from the start end designation circuit 43 is at a level (for example, a low level) representing a "non-measured" state.

The first detection signal S1 from the first timing detection circuit 33 is inputted to a second timing detection circuit 34 and third timing detection circuit 35.

The second timing detection circuit 34 includes a counting circuit and starts to count the first clock signal CK1 from the time of the outputting of the first detection signal S1 from the first timing detection circuit 33. And the second timing detection circuit 34 detects, as a driving timing, a timing at which the count value becomes equal to a first set value P1 as will be set out below, and outputs a second detection signal S2 in synchronization with this detection timing.

Further, the third timing detection circuit 35 includes, as in the case of the second timing detection circuit 34, a counting circuit and starts to count the second clock signal CK2 from the outputting of the first detection signal S1 from the first timing detection circuit 33.

And the third timing detection circuit 35 detects, as a sampling start timing, a timing at which its count value becomes equal to a second set value P2 as will be set out below, and outputs a third detection signal S3 in synchronization with this detection timing.

Figure 2:
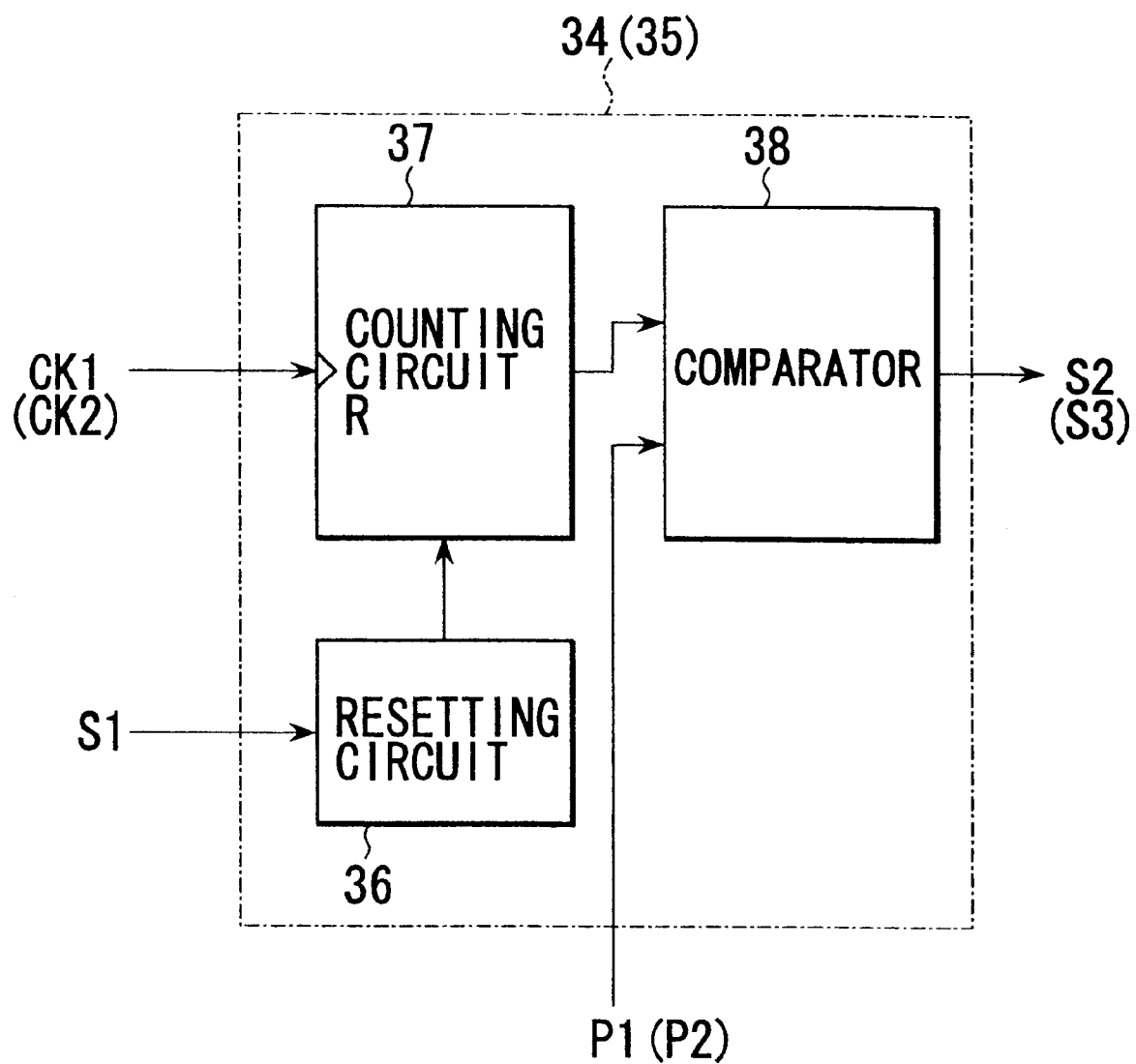
FIG. 2 is a circuit arrangement showing one practical structural form of a major section of the OTDR according to the first embodiment of the present invention.

It is to be noted that the second timing detection circuit 34 and third timing detection circuit 35 are so configured as shown, for example, in FIG. 2.

First, a resetting circuit 36 outputs a reset signal in synchronization with the first detection signal S1.

And the counting circuit 37 is reset with a reset signal synchronized with the first detection signal S1 and then starts the counting of the first clock signal CK1 or second clock signal CK2.

A digital comparator 38 compares a count result of the counting circuit 37 with the first set value P1 or second set value P2.

And the output of the digital comparator 38 is provided as the second detection signal S2 or third detection signal S3.

Though being not shown in the Figures, the second timing detection circuit 34 and third timing detection circuit 35 may be so configured as to preset the set value P1 or P2 (or its complement) to a presettable counting circuit in synchronization with the first detection signal S1 and provide a borrow output (or carry output) of the counting circuit as the second detection signal S2 or third detection signal S3.

Then a drive pulse generation circuit 40 is such that, each time the second detection signal S2 is outputted from the second timing detection circuit 34, the circuit 40 generates a drive pulse Pd of a predetermined width in synchronization with the second detection signal S2 and supplied it to the light pulse generation section 12.

Further, a sampling pulse generation circuit 41 is such that, each time the third detection signal S3 is outputted from the third timing detection circuit 35, the circuit 41 continuously outputs an N number of sampling pulses PS to the A/D converter 14 in synchronization with the second clock signal CK2.

Further, a set value switching circuit 42 is such that, each time the sampling pulse generation circuit 41 outputs the N number of sampling pulses Ps, the circuit 42 updates the first set value P1 and second set value P2, in increments of a predetermined value $\Delta p$ from a predetermined value (for example, 0).

Here, the start end designation circuit 43 is such that, when a measurement start operation is effected by the operation section 44, the circuit 43 sets the state signal J to a high level representing "now being measured".

After the drive pulses Pd has been outputted a predetermined number of times, M, from the drive pulse generation circuit 40 and the sampling pulses Ps have been outputted, an N number of times, following the outputting of the M-th drive pulse Pd, the start end designation circuit 43 causes the state signal J to be set to a low level representing the non-measured state following the end of a series of measurement and, by doing so, stops the function of the first timing detection circuit 33.

Further, a measurement condition setting means 45 sets parameters corresponding to an observation range Ta, time resolution (equivalent sampling period) $\Delta T$ and pulse width Tw designated by the operation of the operating section 44 to the drive pulse generation circuit 40, sampling pulse generation circuit 41, set value switching circuit 42 and start end designation circuit 43 in the measurement control circuit 31.

Here it is assumed that the observation range Ta is designated by a value of an integral multiple of a period T2 of the second clock signal CK2 and that the time resolution (equivalent sampling period) $\Delta T$ is designated by a value corresponding to an integral multiple of a period difference $\Delta t$ and equally dividing the period T2 of the second clock signal CK2.

That is, the measurement condition setting means 45 sets a designated pulse width Tw to the drive pulse generation circuit 40, sets a number of times, N, the sampling pulse Ps is outputted, to the sampling pulse generation circuit 41, sets a variable width $\Delta P$ of the set values P1, P2 to the set value switching circuit 42, and sets a number of times, M, the drive pulse Pd is outputted, as well as a number of times, N, the sampling pulse PS is outputted, to the start end designation circuit 43.

Here, in order to hold the following equations (1), (2) and (3) based on a designated observation range Ta, time resolution $\Delta T$, period T2 of the second clock signal CK2 and period difference $\Delta t$, the measurement condition setting means 45 determines the respective values of $\Delta p$, N and M.

Here, the observation range Ta gives a tentative value of a period for obtaining data by the equivalent sampling and the actual observation period for performing the equivalent sampling is longer than this observation range Ta.

$$\Delta T/\Delta t=\Delta p \tag{1}$$

$$Ta/T2=N \tag{2}$$

$$T2/\Delta T=M \tag{3}$$

For example, as set out above, it is assumed that the period T2 of the second clock signal CK2 is 20 nS, the period difference Δt, 0.1 nS, the designated observation range Ta, 1000 nS, and the time resolution ΔT, 0.1 nS.

Then, in this case, the variable width Δp of the first and second set values P1, P2 becomes unity from the equation (1).

And the number of times, N, the sampling pulse Ps is outputted becomes 50 from the equation (2).

And the number of times, M, the drive pulse is outputted becomes 200 from the equation (3).

It is to be noted that the total number of data obtained under this condition becomes M·N=10000.

Here, the time resolution ΔT is designated from the operation section 44.

Since the total number of data, W, obtainable by the OTDR 30 involved is sometimes restricted by the capacity of a later-described memory 47, the time resolution ΔT may be automatically set by the capacity of the memory 47 and observation range Ta.

It is assumed that, when the total number of data, W, storable in the memory 47 is restricted to 10000 for example, the observation range Ta=2000 nS, is designated.

In this case, the time resolution ΔT=0.2 nS is automatically found by calculating the W/Ta and a variable width Δp=2 corresponding to this time resolution is set.

On the other hand, since a data writing means 46 allows the data which is outputted from the A/D converter 14 to be stored in the memory 47, it writes the data while, upon reading of the data in an address sequence from the memory 47, designating the address so as to allow the data to provide waveform data continuous with respect to the time.

That is, from the outputting of a first drive pulse Pd (1) from the drive pulse generation circuit 40, an N number of data D (1,1), D (1,2), D (1,3), . . . , D (1,N) outputted from the A/D converter 14 are stored in the memory 47 at addresses 0, M, 2M, 3M, . . . , (N−1) M.

And from the outputting of a second drive pulse Pd (2) from the drive pulse generation circuit 40, an N number of data D (2,1), D (2,2), D (2,3), . . . , D (2,N) outputted from the A/D converter 14 are stored in the memory 47 at addresses 1, M+1, 2M+1, 3M+1, . . . , (N−1)M+1.

In the same way as set out above, the data is stored in the memory 47 and, from the outputting of an M-th drive pulse Pd (M) from the drive pulse generation circuit 40, an N number of data D (M,1), D (M,2), D (M,3), . . . , D (M,N) outputted from the A/D converter 14 are stored in the memory 47 at addresses M−1, 2M−1, 3M−1, . . . , NM−1.

By such address designation, a series of time sequential waveform data is stored in an address sequence in the memory 47 at addresses 0, 1, . . . , NM−1.

A data processing section 48 reads out the series of waveform data stored in the memory 47 and performs various kinds of calculation operations: necessary to the evaluation of the transmission characteristic of the optical fiber line path 1 and outputs a result of calculation and waveform to an output device 49.

The output device 49 may be any of an image display device, printer, a communication device for making communication to an external device, a drive of a portable storage medium such as a floppy disk, and so on.

Now the operation of this OTDR 30 will be explained below with the period T2 of the second clock signal CK2 designated to 20 nS, time difference Δt to 0.1 nS, observation range Ta to 1000 nS and time resolution ΔT to 0.1 nS as set out above.

In this case, as set out above, the number of times, N, of the sampling pulse Ps per light pulse is outputted is set to a sampling pulse generation circuit 41 (N=50).

The variable width Δp=1 is set to the set value switching circuit 42.

The number of times M=200 of the outputting of the drive pulse Pd and number of times N=50 of the outputting of the sampling pulse Ps are set to the start end designation circuit 43.

If, in this state, the measurement start operation is performed by the operation section 44, the state signal J of the start end designation circuit 43 varies to a high level at time t0 as shown in FIG. 3A to set the first timing detection circuit 33 to an operative state.

And, when the phases of the first clock signal CK1 and second clock signal CK2 coincide with time t1 as shown in FIGS. 3B and 3C, then a first detection signal S1 rising at time ti as shown in FIG. 3D is outputted from the first timing detection circuit 33.

Since, at this time, the initial values of the first set value P1 and second set value P2 are both 0's as shown in FIG. 3E, a second detection signal S2 synchronized with the first detection signal S1 as shown in FIG. 3F is outputted from the second timing detection circuit 34.

And, at this time, a first drive pulse Pd (1) of a predetermined width Tw synchronized with the second detection signal S2 as shown in FIG. 3G is outputted from the drive pulse generation circuit 40.

And a light pulse synchronized with the drive pulse Pd (1) exits from the light pulse generation section 12 and enters into the optical fiber line path 1 as an object of testing.

The returned light from the optical fiber line path 1 is received by the light receiving unit 13.

The received light is subjected by the light receiving unit 13 to photoelectric conversion and the output is inputted to the A/D converter 14.

As shown in FIG. 3H, a third detection signal S3 synchronized with the first detection signal S1 is outputted also from the third timing detection circuit 35.

Then an N number of (50) sampling pulses (1) are outputted from the sampling pulse generation circuit 41 with a first clock synchronized with the third detection signal S3 as shown in FIG. 3I and with a phase (period T0) the same as the second clock signal CK2.

The A/D converter 14 receives the a N number of (50) sampling pulses Ps with a head clock synchronized with the drive pulse Pd (1) to allow the receiving signal to be sampled and, by doing so, outputs an N number of data D (1,1), D (1,2), . . . , D (1,50).

This series of data is written by the data writing means 46 into the memory 47 at addresses, 200, 400, 600, . . . , 9800.

At time t2 following the outputting of the N-th (50-th) clock of the sampling pulse Ps, the set values P1, P2 are both switched to 1 as shown in FIG. 3E.

And at time t3 immediately after this, again the phases of the first clock signal CK1 and second clock signal CK2 coincide with each other and a first detection signal S1 is outputted from the first timing detection circuit 33.

And then at time t4 at which the first clock signal CK1 is inputted a second detection signal S2 is outputted from the second timing detection circuit 34.

And, at time t4, a second drive pulse Pd (2) is outputted from the drive pulse generation circuit 40 and a second light pulse is incident into the optical fiber line path 1.

And at time t5 delayed by $\Delta T$ (=$\Delta t$=0.1 nS) from time t4 a second detection signal S3 is outputted from the third timing detection circuit 35.

Then, from the sampling pulse generation circuit 41, as in the above case, an N number of (50) sampling pulses Ps (2) with the same phase (Period T0) as the second clock signal CK2 are outputted to the A/D converter 14.

And an N number of (50) data D (2,1), D (2,2), D (2,3), . . . , D (2,50) are outputted from the A/D converter 14 to allow them to be stored in memory 16 at addresses 1, 201, 401, 601, . . . , 9801.

In the same way as set out above, similar operations are repeated 200 numbers of times and, each time one drive pulse Pd is outputted, respective N numbers of (50) sampling pulses Ps (1), Ps (2), . . . , Ps (200) are outputted.

In this case, respective sampling pulses Ps (1), Ps (2), . . . , Ps (200) are outputted while being delayed by $\Delta T$ (=$\Delta t$=0.1 nS) with respect to respective drive pulses Pd (1) to Pd (200) as shown in FIGS. 4A–4F.

At a stage at which a last set of sampling pulses Ps (200) is outputted, it is possible to obtain 10000 data D (1,1), . . . , D (200,500) with a resolution of 0.1 nS.

The 10000 data is equivalent to 10000 data obtained by continuously sampling a receiving signal which is outputted from the light receiving unit 13, an M·N number of times (10000 times), with a period of an integral multiple (in this case, 1 times) of a period difference $\Delta t$ during a period from the incidence of a light pulse into the optical fiber line path 1 to an elapse of an N·T2–$\Delta T$ (=999.9 nS) time.

In the case of effecting such equivalent sampling, a time (distance) accuracy upon measurement is determined by a period difference of two clock signals CK1, CK2 of a fixed frequency generated from the clock signal generation circuit 32.

Here, the stabilization of this period difference in the above-mentioned numeral range can be very easily achieved based on respective oscillation frequencies of two mutually independent crystal oscillation circuits X1, X2 used as the clock signal generation circuit 32.

Thus, the resolution accuracy relating to the time (distance) of this OTDR 30 becomes outstandingly higher than in the case of using delay elements as in the prior art and using a ramp function and it is possible to accurately group a detail of the characteristic of the optical fiber line path 1 from a series of data stored in the memory 47.

Further, since, as set out above, the resolution relating to the time (distance) is determined by the period difference of the two clock signals CK1, CK2, it is possible to achieve a higher resolution without increasing constituent elements involved and to make the apparatus compact as a whole.

Although, in the above-mentioned explanation, the designated time resolution $\Delta T$ has been explained as being equal to the period difference $\Delta t$, the time resolution $\Delta T$ can be designated as any value of an integral multiple of the period difference $\Delta t$ by equally dividing the period T2 of the second clock signal CK2.

In the case where, for example, the time resolution $\Delta T$ is designated to 0.5 nS corresponding to five times the $\Delta t$, it follows that, from the equations (1), (2) and (3), the variable width $\Delta p$ of the set values P1, P2 is 5, the number of times, M, the drive pulse is outputted is 40, and the number of times, N, the sampling pulse is outputted is 50. In this case, the total number of samplings becomes 2000.

In the above explanation, the initial values of the first set value P1 and second set value P2 are both 0 and the head pulse of the first outputted one of the N number of sampling pulses Ps (1) and drive pulse Pd (1) have their leading edges made to coincide with each other.

Therefore, the initial values of the first set value P1 and second set value P2 are set to be a nonzero value and it is possible that, from an elapse of a predetermined time from the incidence of the light pulse into the optical fiber line path 1, a receiving signal is sampled.

For example, if the initial values of the first set value P1 and second set value P2 are both 4, it is possible to make the head pulse of the first outputted one of the N number of sampling pulse Ps (1) delayed by 4·$\Delta t$ (0.4 nS in the above-mentioned numeral example) from the drive pulse Pd (1).

Further, it is possible to set the initial set values of the first set value P1 and second set value P2 to different values.

If, for example, the initial value of the first set value P1 is m and the initial set value of the second set value P2 is n (m<n), then it is possible to make the head pulse of the sampling pulse Ps (1) delayed by m·$\Delta t$+(n−m) T2 from the output timing of the drive pulse Pd (1).

Further, in the above explanation, the first set value P1 and second set value P2 are increased monotonically in units of a predetermined variable width $\Delta p$ from the initial value to sequentially delay the output start timings of respective N1 numbers of sampling pulses Ps (1), Ps (2), . . . , P (M) by $\Delta T$.

Thus, this does not restrict the prevent invention and the sequence of occurrences of the respective N numbers of sampling pulses Ps (1), Ps (2), . . . , P (M) can be arbitrarily set.

As in a way reverse to the above-mentioned case, for example, it may be possible that the first set value P1 and second set value P2 are decreased monotonically in units of a predetermined variable width $\Delta p$ from their initial value and the output start timings of respective N numbers of sampling pulses Ps (1), Ps (2), . . . , P (M) are sequentially quickened by $\Delta T$.

Further, it may be possible that the variable width of the first set value P1 and second set value P2 is switched with, for example, two times the above-mentioned $\Delta p$ and, out of respective N numbers of sampling pulses Ps (1), Ps (2), . . . , P (M), odd numbers of sampling pulses Ps (1), Ps (3), . . . , P (M−1) (M: an even number) may be first generated and then even numbers of sampling pulses Ps (2), Ps (4), . . . , P (M) be generated.

Even in such a case, it is necessary to maintain the difference of the first set value P1 and second set value P2 constant so that a maximal shift of the output start timing between the respective N numbers of sampling pulses Ps (1), Ps (2), . . . , P (M) is made smaller than the period T2 of the second clock signal CK2.

Although, in the above explanation, data averaging processing has been omitted for easiness in the understanding of the present invention, the above-mentioned equivalent sampling processing is generally performed a plurality of times to obtain a series of waveform data a plurality of times and, by subjecting them to additive processing and averaging processing, characteristic calculation processing and waveform display processing are performed on the averaged data.

The averaging processing is performed by writing data into the memory 47 while performing such additive processing at the data writing circuit 46 or, once a plurality of waveform data is written into the memory 47, the averaging processing is done by the data processing section 48.

As explaining above, the OTDR according to the first embodiment of the present invention is so configured that a first clock signal of a period T1 and second clock of a period T2 are outputted from a clock signal generating means, the period T2 having a period difference Δt equal to a time corresponding to a maximal distance resolution required of the apparatus with respect to the period T1, a first timing detecting means detects a timing at which the two clock signals are set to a predetermined phase difference, a second timing detecting means detects a timing at which the first clock signal is outputted a plurality of times equal to a first set value from a detection timing, a drive pulse synchronized with the detection timing is outputted a plurality of times, M, to a light pulse generation section, a third timing detecting means detects a timing at which the second clock signal is outputted a number of times equal to a second set value from the detection timing of the first timing detecting means, a predetermined N number of sampling pulses synchronized with the second clock signal are outputted to an A/D converter from this detection timing and, each time the predetermined N number of sampling pulses are outputted, the first set value and second set value are switched by a set value switching means sequentially to different values while their difference is maintained to a fixed value and, by performing respective N numbers of samplings on a light receiving signal a number of M times by switching the first set value and second set value, data is obtained as equivalent data involved when the light receiving signal outputted from a light receiving unit is continuously M·N times sampled with a period of an integral multiple of a period difference Δt of the first clock signal and second clock signal.

In the OTDR according to the first embodiment of the present invention, the resolution relating to the time in the interleave sampling is determined by the period difference of the two clock signals and, by stabilizing the period difference of these two clock signals, it is possible to easily enhance the accuracy and to accurately grasp a detail of the characteristic of the optical fiber line path.

Further, in the OTDR according to the first embodiment of the present invention, it is possible to realize a high resolution without increasing the number of constituent elements and to make the apparatus compact as a whole.

The minimal resolution ΔT of the OTDR is determined by the period difference Δt of the two clock signals CK1, CK2, but the actually manufactured OTDR is such that, with respect to the minimal resolution 500 ps/1 nS/2 nS/5 nS/10 nS . . . , the operation is done with the period difference Δt of the two clock signals CK1, CK2 being 100 ps only.

That is, the time ΔT corresponding to the resolution of the actually manufactured OTDR is adapted to be selectively set to 500 ps/1 nS/2 nS/5 nS/10 nS . . . , on the operation panel while the period difference Δt of the two clock signals CK1, CK2 is fixed to 100 ps at which the operation is done.

In actuality, with respect to the above-mentioned ΔT (a time corresponding to the resolution), the period difference Δt of the two clock signals CK1, CK2 includes a value smaller than the ΔT.

Second Embodiment

The arrangement of the second embodiment is the same as that of the first embodiment shown in FIG. 1.

And, in the second embodiment, from the period difference of two clock signals a delay is given to a timing for starting the sampling of the above-mentioned returned light signal.

That is, in order to make an adjustment on the axis of abscissa (distance) in a display screen of the OTDR 30, it is necessary to make an adjustment between the exit timing of a light (LD) pulse from a light pulse generation section 12 and the timing of sampling returned light (signal) from an optical fiber line path 1 to be measured.

Figure 5A:
FIGS. 5A to C are a timing chart for explaining the operation of an OTDR according to a second embodiment of the present invention.
Figure 5B:
Figure 5C:

In order to make this adjustment, a delay circuit is required to make a delay time Δd from the exit timing of the LD pulse to the timing of actually starting the sampling of the light signal accurately (to a time accuracy smaller than the time corresponding to the resolution of the OTDR 30) variable, as shown in FIGS. 5A, 5B and 5C, over a wider range (a time difference resulting from a delay caused by an optical system such as an optical fiber in the OTDR 30 and a delay caused by an electrical circuit system such as an amplifier, about a few 100 nS).

Figure 6:
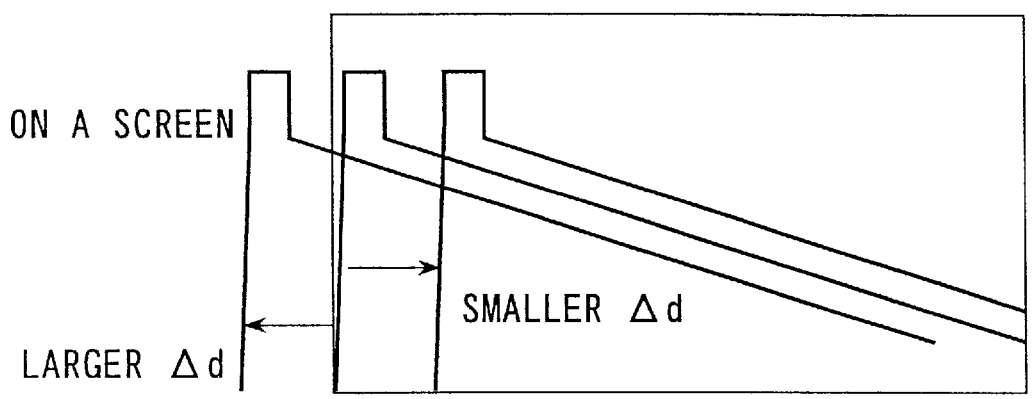
FIG. 6 is a waveform diagram for explaining the operation of the OTDR according to the second embodiment of the present invention.
Figure 7:
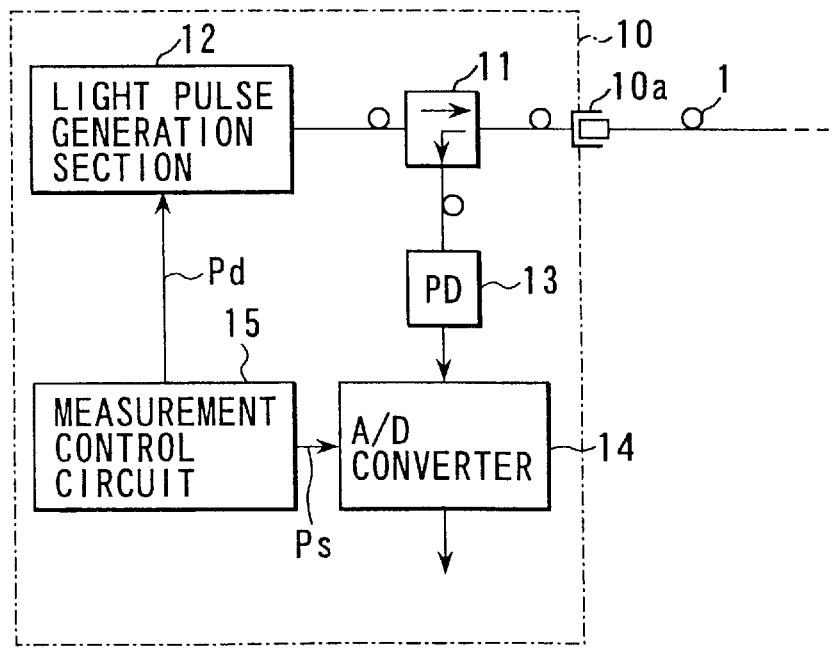
FIG. 7 is a block circuit showing a structure of a conventional OTDR.
Figure 9:
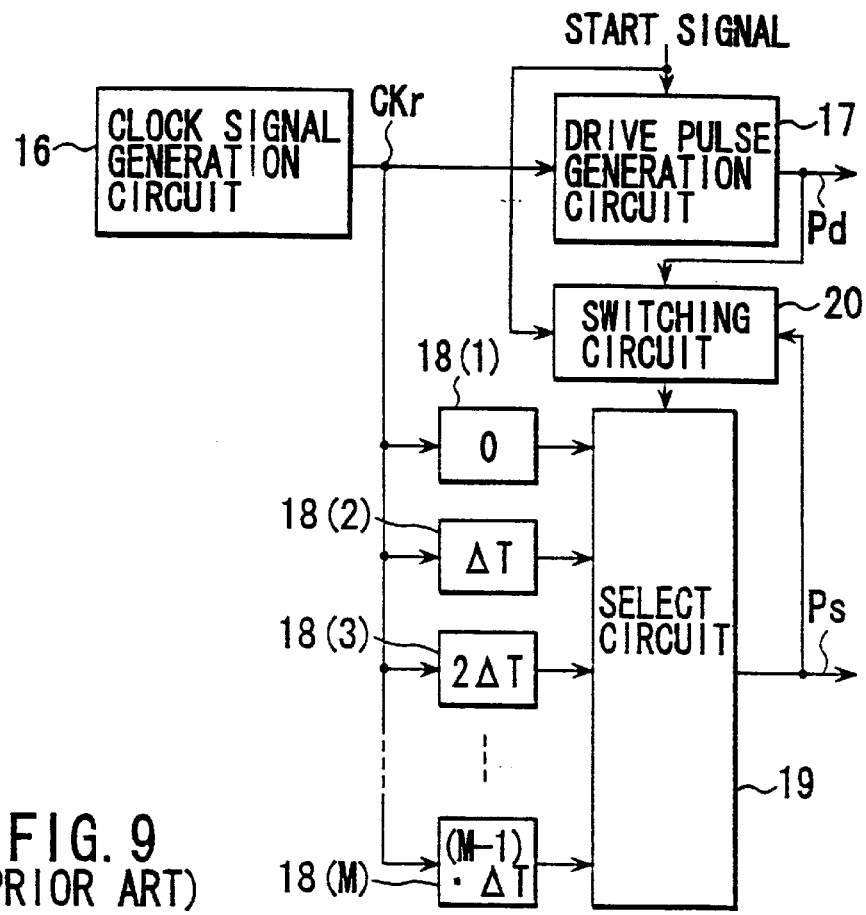
FIG. 9 is a block diagram showing one schematic form of a major section of the conventional OTDR.
Figure 10:
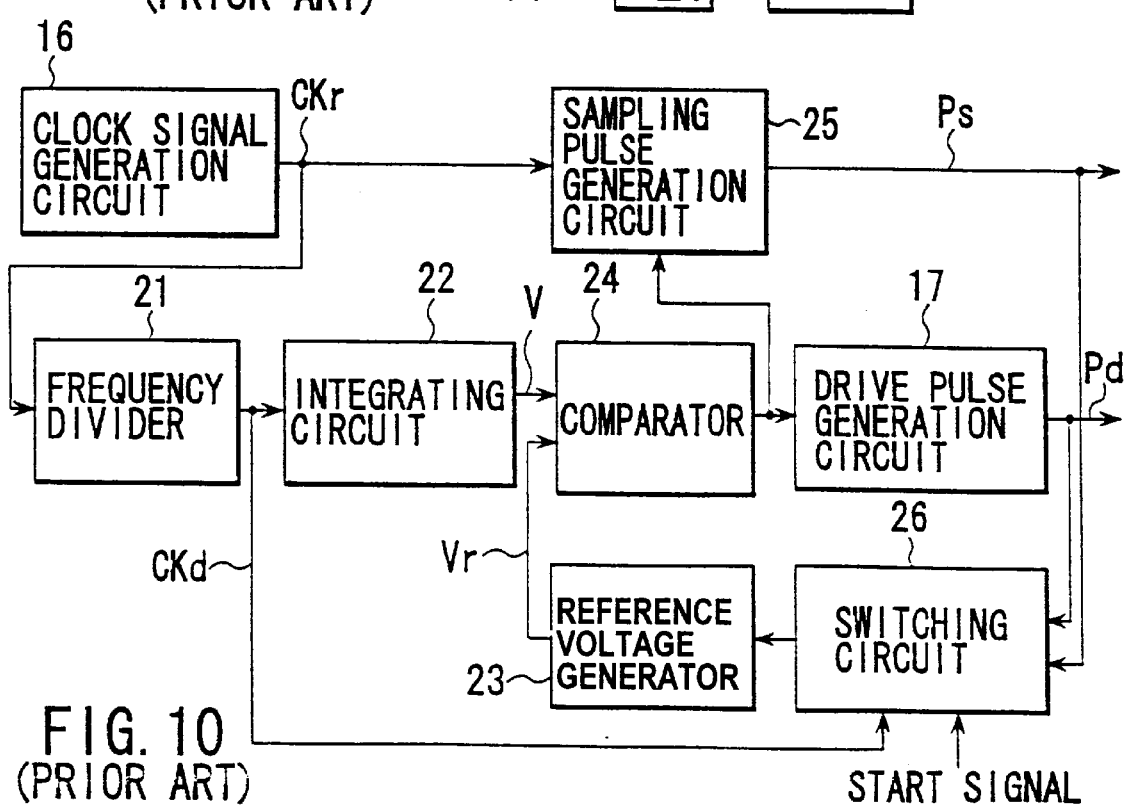
FIG. 10 is a block diagram showing one schematic form of the conventional OTDR.

This delay circuit is required to adjust the axis of an abscissa (distance) on the display screen of the OTDR as shown in FIG. 6.

That is, if the delay time Δd is too greater, then the head portion of a displaying waveform is shifted out of the left end of the display screen and is not displayed.

Further, if the delay time Δd is too smaller, the head portion of the d i splaying waveform is displaced from a start position on the display screen.

In the second embodiment, in order to provide a delay time Δd suitable to the correct display of the head portion of the displaying waveform from the start position of the display screen by a delay circuit, from the phase difference of the two clock signals a delay is given to the timing of starting the sampling of the above-mentioned light signal.

In more detail, an LD pulse (a drive pulse Pd imparted to the light pulse generation section 12) and sampling clock (a sampling pulse Ps imparted to an A/D converter 14) are generated from the phase difference (Δt) of the first and second clock signals CK1 (a period T1) and CK2 (a period T2) of different phases from the clock signal generation circuit 32.

At this time, from the timing (t1) at which the above-mentioned two clock signals are put mutually in phase (or a predetermined phase difference) as shown in FIGS. 3B and 3C, and LD pulse Pd is exited at a timing of the m counting of the first clock signal CK1 and a sampling clock Ps is generated from a timing of the n counting of the second clock signal CK2.

At this time, the delay time Δd from the exit timing of the above-mentioned LD pulse Pd to the timing of actually starting the sampling of the light signal by the sampling clock Ps is given by $$\Delta d = T2 \times n - T1 \times m$$
$$= \Delta t \times m + T2 \times (n - m)$$

Here, if m, n can be made to be arbitrarily set, it is possible to generate any delay time Δd with a minimal resolution Δt of the OTDR 30 (FIGS. 3A–I).

According to the OTDR of the second embodiment of the present invention, the resolution relating to the time under the interleave sampling is determined by the period difference of the two clock signals and, by stabilizing the period difference of the two clock signals, it is possible to enhance the accuracy easily. By correctly displaying the head portion of the displaying waveform from the start position of the display screen it is possible to grasp a detail of the characteristic of the optical fiber line path.

Even in the OTDR according to the second embodiment of the present invention it is possible to realize a high resolution without correspondingly increasing the number of constituent elements involved and to provide a compact unit as a whole.

What is claimed is:

1. An optical time domain reflectometer (OTDR) comprising:
   a light pulse generation section for receiving a drive pulse and generating a light pulse in synchronization with the drive pulse;
   light branching means for causing the light pulse which exits from the light pulse generation section to be incident into an optical fiber line path as an object of testing, and for taking out returned light from the optical fiber line path;
   a light receiving unit for receiving the returned light taken out by the light branching means and converting it to a receiving signal;
   an analog to digital (A/D) converter for receiving a sampling pulse of a period T0 and, by subjecting the receiving signal to equivalent sampling in synchronization with the sampling pulse, converting the receiving signal to digital data;
   a measurement control circuit for generating the drive pulse a number of (M) times and outputting it to the light pulse, generation section and for generating respective N numbers of sampling pulses relative to an output timing of the drive pulse at each number of times and outputting the sampling pulses to the A/D converter while delaying the respective N generation start timings by a time ΔT corresponding to 1/M of the period T0;
   clock signal generating means, for outputting to the measurement control circuit, a first clock signal of a period T1 and a second clock signal of a period T2 having a period difference Δt equal to a time corresponding to a minimal resolution required of the OTDR relative to the period T1; and
   data processing means for obtaining a series of data representing an intensity variation relative to a time elapse of the returned light based on the digital data outputted from the A/D converter;
   wherein the measurement control circuit provides a delay of the time ΔT to the sampling pulse based on the period difference Δt of the first clock signal and second clock signal from the clock signal generating means.

2. An OTDR according to claim 1, wherein:
   from the period difference (Δt) of the first clock signal (period T1) and second clock signal (period T2) of mutually different phases from the clock signal generating means, the measurement control circuit generates the drive pulse supplied to the light pulse generation section and the sampling pulse supplied to the A/D converter,
   the drive pulse is generated at a timing of an m counting of the first clock signal from a timing at which the first and second clock signals are one of: (i) put mutually in phase and (ii) put in a predetermined phase difference, and a sampling clock is generated from a timing of an n counting of the second clock signal therefrom, and
   a delay time Δd from the generation timing of the drive pulse to the timing of starting the sampling of the receiving signal by the sampling pulse is given by $$\Delta d = T2 \times n - T1 \times m$$
   $$= \Delta t \times m + T2 \times (n - m).$$

3. An OTDR according to claim 2, wherein, by making m and n arbitrarily settable, any delay time Δd is generated with the minimal resolution of the OTDR.

4. An OTDR according to claim 1, wherein the measurement control circuit comprises:
   first timing detecting means for detecting a timing at which the first clock signal and second clock signal are put to a predetermined phase difference;
   second timing detecting means for detecting a timing at which the first clock signal is outputted a number of times equal to a first set value from the detection timing of the first detecting means;
   drive pulse generating means for outputting a drive pulse of a predetermined width synchronized with the detection timing of the second timing detecting means to the light pulse generating means;
   third timing detecting means for detecting a timing at which the second clock signal is outputted a number of times equal to a second set value from the detection timing of the first timing detecting means; and
   sampling pulse generating means for outputting a predetermined N number of sampling pulses to the A/D converter from the detection timing of the third timing detecting means to allow the receiving signal to be sampled, the sampling pulse being synchronized with the second clock signal.

5. An OTDR according to claim 4, wherein the second timing detecting means includes a time counting circuit, starts the counting of the first clock signal from a time of the outputting of a first detection signal from the first timing detecting means, detects a timing at which its count value becomes equal to the first set value as a drive timing, and outputs a second detection signal synchronized with the detection timing.

6. An OTDR according to claim 5, wherein the third timing detecting means includes a time counting circuit, starts the counting of the second clock signal from a time of the outputting of the first clock signal from the first timing detecting means, detects a timing at which its count value becomes equal to the second set value as a sampling start timing, and outputs a third detection signal synchronized with this detection timing.

7. An OTDR according to claim 6, wherein the second timing detecting means and third timing detecting means, respectively, have a resetting circuit, counting circuit and digital comparator; the resetting circuit outputs a reset signal synchronized with the first detection signal; the counting circuit starts the counting of the first clock signal or second clock signal from a time of being reset with a reset signal synchronized with the,first detection signal outputted from the resetting circuit; and the digital comparator compares a result of counting by the counting circuit with the first set value or second set value and outputs the second detection signal or third detection signal.

8. An OTDR according to claim 1, wherein the clock signal generating means includes a first crystal oscillation circuit for outputting the first clock signal of the period T1 and a second crystal oscillation circuit for outputting the second clock signal of the period T2 having the period difference Δt equal to, or smaller than, a time corresponding to the minimal resolution required of the OTDR relative to the period T1.

9. An OTDR according to claim 1, wherein the period difference Δt of the first and second clock signals includes a value smaller than the minimal resolution of the OTDR.

10. An optical time domain reflectometer (OTDR) for causing a light pulse which is synchronized with a drive pulse to exit from a light pulse generation section and the exit light pulse to be incident into an optical fiber line path as an object of testing, receiving returned light from the optical fiber line path at a light receiving unit and converting it to a receiving signal, and, while sampling the receiving signal by an analog to digital (A/D) converter, obtaining a series of data representing an intensity variation relative to a time elapse of the returned light, the OTDR comprising:

clock signal generating means for generating a first clock signal of a period T1 and a second clock signal of a period T2 having a period difference Δt equal to or smaller than a time corresponding to a minimal distance resolution required of the OTDR relative to the period T1;

first timing detecting means for detecting a timing at which the first clock signal and second clock signal are put to a predetermined phase difference;

second timing detecting means for detecting a timing at which the first clock signal is outputted a number of times equal to a first set value from the detection timing;of the first timing detecting means;

drive pulse generating means for outputting a drive pulse of a predetermined width synchronized with the detection timing of the second timing detecting means to the light pulse generating means;

third timing detecting means for detecting a timing at which the second clock signal is outputted a number of times equal to a second set value from the detection timing of the first timing detecting means;

sampling pulse generating means for outputting a predetermined N number of sampling pulses synchronized with the second clock signal to the A/D converter from the detection timing of the third timing detecting means and sampling said receiving signal; and set value switching means for, each time the predetermined N number of sampling pulses are outputted from the sampling pulse generating means, sequentially switching the first set value and second set value to different values while setting a difference of these set values constant;

wherein, by performing respective N numbers of samplings on the light receiving signal a number of M times by switching the first set value and- second set values, data is obtained as equivalent data involved when the light receiving signal outputted from the light ;receiving unit is continuously M·N times sampled with a period of an integral multiple of the period difference Δt of the first clock signal and second clock signal.

11. An optical time domain reflectometer (OTDR) comprising:

a light pulse generation section for receiving a drive pulse and generating a light pulse in synchronization with the drive pulse;

light branching means for causing the light pulse which exits from the light pulse generation section to be incident into an optical fiber line path as an object of testing, and for taking out returned light from the optical fiber line path;

a light receiving unit for receiving the returned light taken out by the light branching means and converting it to a receiving signal;

an analog to digital (A/D) converter for receiving a sampling pulse of a period T0 and, by subjecting the receiving signal to equivalent sampling in synchronization with the sampling pulse, converting the receiving signal to digital data;

a measurement control circuit for generating the drive pulse a number of (M) times and outputting it to the light pulse generation section and for generating respective N numbers of sampling pulses relative to an output timing of the drive pulse at each number of times and outputting the sampling pulses to the A/D converter while delaying the respective N generation start timings by a time ΔT corresponding to 1/M of the period T0;

clock signal generating means, for outputting to the measurement control circuit, a first clock signal of a period T1 and a second clock'signal of a period T2 having a period difference Δt equal to a time corresponding to a minimal resolution required of the OTDR relative to the period T1; and data processing means for obtaining a series of data representing an intensity variation relative to a time elapse of the returned light based on the digital data outputted from the A/D converter;

wherein the measurement control circuit provides a delay of the time ΔT to the sampling pulse based on the period difference Δt of the first clock signal and second clock signal from the clock signal generating means;

wherein, from the period difference (Δt) of the first clock signal (period T1) and second clock signal (period T2) of mutually different phases from the clock signal generating means, the measurement control circuit generates the drive pulse supplied to the light pulse generation section and the sampling pulse supplied to the A/D converter;

wherein the drive pulse is generated at a timing of an m counting of the first clock signal from a timing at which the first and second clock signals are one of: (i) put mutually in phase and (ii) put in a predetermined phase difference, and a sampling clock is generated from a timing of an n counting of the second clock signal therefrom; and wherein a delay time Δd from the generation timing of the drive pulse to the timing of starting the sampling of the receiving signal by the sampling pulse is given by $$\Delta d = T2 \times n - T1 \times m$$
$$= \Delta t \times m + T2 \times (n - m).$$

12. An OTDR according to claim 11, wherein, by making m and n arbitrarily settable, any delay time Δd is generated with the minimal resolution of the OTDR.

13. An OTDR according to claim 11, wherein the clock signal generating means includes a first crystal oscillation circuit for outputting the first clock signal of the period T1 and a second crystal oscillation circuit for outputting the second clock signal of the period T2 having the period difference Δt equal to, or smaller than, a time corresponding to the minimal resolution required of the OTDR relative to the period T1.

14. An OTDR according to claim 11, wherein the period difference Δt of the first and second clock signals includes a value smaller than the minimal resolution of the OTDR.

15. An optical time domain reflectometer (QTDR) comprising:

a light pulse generation section for receiving a drive pulse and generating a light pulse in synchronization with the drive pulse;

light branching means for causing the light pulse which exits from the light pulse generation section to be incident into an optical fiber line path as an object of testing, and for taking out returned light from the optical fiber line path;

a light receiving unit for receiving the returned light taken out by the light branching means and converting it to a receiving signal;

an analog to digital (A/D) converter for receiving a sampling pulse of a period T0 and, by subjecting the receiving signal to equivalent sampling in synchronization with the sampling pulse, converting the receiving signal to digital data;

a measurement control circuit for generating the drive pulse a number of (M) times and outputting it to the light pulse generation section and for generating respective N numbers of sampling pulses relative to an output timing of the drive pulse at each number of times and outputting the sampling pulses to the A/D converter while delaying the respective N generation start timings by a time $\Delta T$ corresponding to 1/M of the period T0;

clock signal generating means, for outputting to the measurement control circuit, a first clock signal of a period T1 and a second clock signal of a period T2 having a period difference $\Delta t$ equal to a time corresponding to a minimal resolution required of the OTDR relative to the period T1; and data processing means for obtaining a series of data representing an intensity variation relative to a time elapse of the returned light based on the digital data outputted from the A/D converter;

wherein the measurement control circuit provides a delay of the time $\Delta T$ to the sampling pulse based on the period difference $\Delta t$ of the first clock signal and second clock'signal from the clock signal generating means; and wherein the measurement control circuit comprises:

first timing detecting means for detecting a timing at which the first clock signal and second clock signal are put to a predetermined phase difference;

second timing detecting means for detecting a timing at which the first clock signal is outputted a number of times equal to a first set value from the detection timing of the first detecting means;

drive pulse generating means for outputting a drive pulse of a predetermined width synchronized with the detection timing of the second timing detecting means to the light pulse generating means;

third timing detecting means for detecting a timing at which the second clock signal is outputted a number of times equal to a second set value from the detection timing of the first timing detecting means; and sampling pulse generating means for outputting a predetermined N number of sampling pulses to the A/D converter from the detection timing of the third timing detecting means to allow the receiving signal to be sampled, the sampling pulse being synchronized with the second clock signal.

16. An OTDR according to claim 15, wherein the second timing detecting means includes a time counting circuit, starts the counting of the first clock signal from a time of the outputting of a first detection signal from the first timing detecting means, detects a timing at which its count value becomes equal to the first set value as a drive taming, and outputs a second detection signal synchronized with the detection timing.

17. An OTDR according to claim 16, wherein the third timing detecting means includes a time counting circuit, starts the counting of the second clock signal from a time of the outputting of the first clock signal from the first timing detecting means, detects a timing at which its count value becomes equal to the second set value as a sampling start timing, and outputs a third detection signal synchronized with this detection timing.

18. An OTDR according to claim 17, wherein the second timing detecting means and third timing detecting means, respectively, have a resetting circuit, counting circuit and digital comparator; the resetting circuit outputs a reset signal synchronized with the first detection signal; the counting circuit starts the counting of the first clock signal or second clock signal from a time of being reset with a reset signal synchronized with the first detection signal outputted from the resetting circuit; and the digital comparator compares a result of counting by the counting circuit with the first set value or second set value and outputs the second detection signal or third detection signal.

* * * * *